(No Model.)
L. J. HIRT.
FRICTION CLUTCH.
No. 458,831. Patented Sept. 1, 1891.
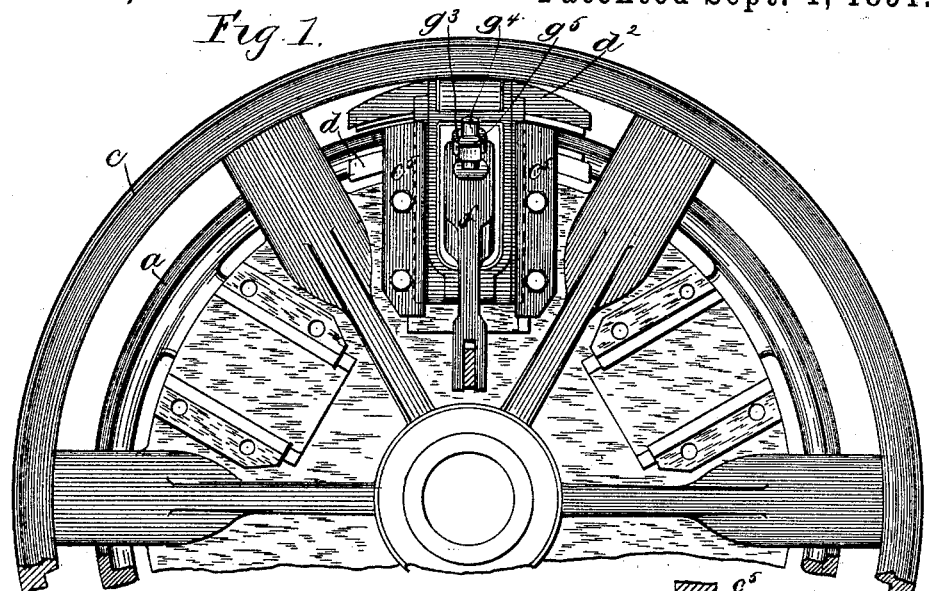
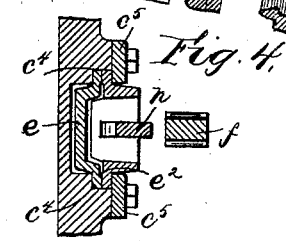
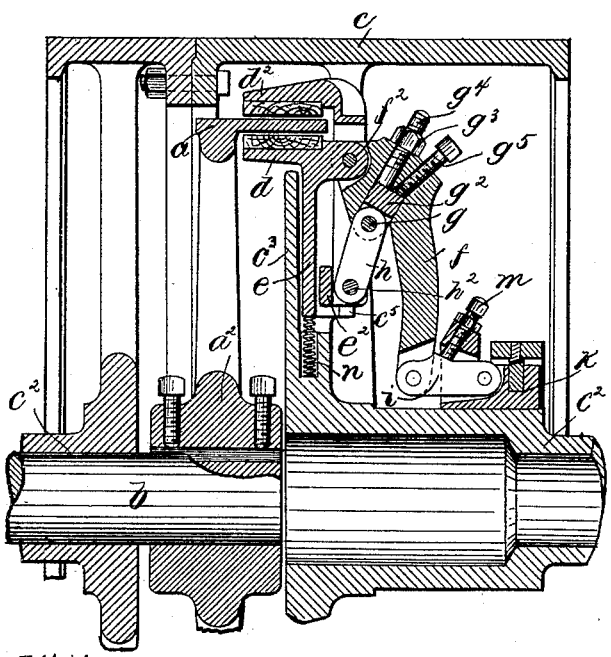
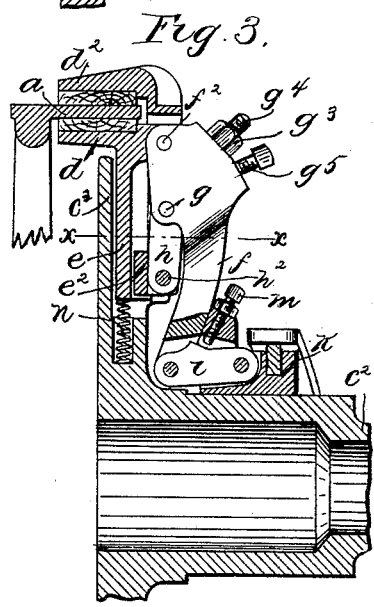
Witnesses
Jas. J. Maloney
M. E. Hill
Inventor,
Louis J. Hirt
by Jno. P. Livermore
Att'y

UNITED STATES PATENT OFFICE.

LOUIS J. HIRT, OF BOSTON, MASSACHUSETTS.

FRICTION-CLUTCH.

SPECIFICATION forming part of Letters Patent No. 458,831, dated September 1, 1891.

Application filed June 11, 1891. Serial No. 395,882. (No model.)

*To all whom it may concern:*

Be it known that I, LOUIS J. HIRT, of Boston, county of Suffolk, State of Massachusetts, have invented an Improvement in Friction-Clutches, of which the following description, in connection with the accompanying drawings, is a specification, like letters on the drawings representing like parts.

My invention relates to a friction-clutch such as is employed to connect and disconnect a shaft with its driving power, said clutch comprising two members, one having a positive connection with the shaft to be driven and the other constituting or forming a part of the power-driven part or pulley from which power is transmitted to said shaft when the clutch is closed or engaged. The invention is shown embodied in a clutch the driven member of which is a cylindrical flange or ring positively connected with the shaft to be driven and the other member of which is a belt-pulley adapted to be turned loosely in its bearings with relation to said shaft, but being provided with gripping-jaws and actuating mechanism therefor, by which the said jaws are caused to grasp or release their hold upon the flange constituting the other member of the clutch. The said gripping-jaws move radially in suitable guideways, one jaw of each pair moving outward to bear against the inner surface of the flange while the other moves inward to grasp the outer surface, the two jaws thus grasping the flange between them like the jaws of a vise. The clutching mechanism is shown as comprising a number of pairs of jaws, each provided with its own actuating mechanism, all arranged to be operated simultaneously by the movement of a suitable clutch-shipper, and it is necessary to describe in detail only one of said pairs of jaws and its actuating mechanism, as all the pairs are alike.

The object of the invention is to provide simple and efficient means for supporting and actuating the clutch-jaws and to arrange the said jaws and their actuating mechanism in such manner that they are readily accessible, it being possible to remove any one set of jaws and its actuating appliances from the clutch without taking apart the clutch or disturbing any of the remaining sets of jaws.

Figure 1 is a face view of a portion of a clutch embodying this invention, showing one pair of jaws and their actuating mechanism in front elevation. Fig. 2 is a sectional view showing the clutch-jaws and their actuating mechanism in longitudinal section and in the position occupied when the clutch is opened or the jaws separated from the flange constituting the other member of the clutch; Fig. 3, a side elevation, partly in section, of the parts shown in Fig. 2 in the position occupied when the jaws of the clutch are closed or gripped on the flange; Fig. 4, a sectional detail on line $xx$, Fig. 3.

The clutch forming the subject of this invention comprises, as usual, two members, one of which, hereinafter referred to as the "driven member," is composed of an annular flange or cylinder $a$, rigidly connected, as by a web or spokes and hub $a^2$, with the shaft $b$, the application of power to which is to be controlled by the clutch. The other or driving member of the clutch is shown as composed of a pulley $c$, to which power may be applied by a belt or in any other suitable or usual manner, the bearing portion $c^2$ of said pulley being constructed to turn freely upon the shaft $b$, so that the rotation of the said pulley $c$ by the driving-power will not turn the said shaft unless proper connection is made between them, the clutch member $c$ also comprising the clutching devices by which said connection is made and removed when required.

The clutching mechanism proper comprises a number of pairs of jaws $d\ d^2$, (one only of which is shown in full,) carried by the pulley $c$ and arranged to grip or release the flange $a$, as required, said jaws $d\ d^2$, having a radial movement in the pulley $c$ for the purpose of closing them upon or withdrawing them from contact with the flange $a$. The said jaws are supported upon a web $c^3$, forming part of the pulley $c$, the shanks or guiding portions $e\ e^2$ of the jaws $d\ d^2$ being so shaped, as best shown in Fig. 4, that both run in suitable guideways $c^4$ at the same side of the web $c^3$, being confined in said guideways by removable gibs or cap-plates $c^5$. Thus by removing the said cap-plates, which, together with the jaw-actuating device, are accessible from the open end of the pulley $c$, the said jaws may be withdrawn from the pulley, if required, for inspection or repairs without necessitating any further separation of the operative parts of the clutch, as would be required if one jaw should work in a guideway at one side and the other jaw in a guideway at the other side of the supporting web or spoke of the driving wheel or pulley in accordance with the arrangement heretofore usually adopted in clutches of this kind.

The clutch-actuating device comprises a lever $f$, pivotally connected at $f^2$ with the inner jaw $d$, and also having a pivotal connection at $g$ with a link $h$, the other end of which is pivotally connected at $h^2$ with the shank $e^2$ of the outer jaw $d^2$. The pivot-bearing $g$ is made in a block or bearing-piece $g^2$, adjustable in a recess in the lever $f$, its adjustment in one direction being effected by a nut $g^3$, working on a bolt $g^4$, that is connected with said block $g^2$, while its adjustment in the other direction is effected by a bolt $g^5$, working in a threaded bolt-hole in the lever $f$ and bearing against the block $g^2$. Thus by loosening the nut $g^3$ and turning in the bolt $g^5$ the pivot-point $g$ is moved farther from the pivot-point or fulcrum $f^2$ of the lever, while by the reverse operation it is moved nearer to the fulcrum $f^2$, such operations increasing or decreasing the length of the broken lines $f^2$ $g$ $h^2$ passing through the three pivot-points by which the jaws, lever, and link are connected. The link $h$, together with the part of the lever $f$, between the bearing-points $g$ and $f^2$, thus constitute a toggle-joint, the straightening of which closes the jaws upon the flange $a$ and thus fastens together the two members of the clutch, so that the power applied to the one member $c$ is transmitted to the shaft connected with the other member $a$, as is required, while the breaking of the toggle-joint or movement of the point $g$ away from the position nearly in line between the points $f^2$ $h^2$ separates the jaws and thus disconnects the two clutch members.

The straightening and breaking of the toggle-joint is effected by the movement of the lever $f$ about the joint at $f^2$ as a fulcrum, the said lever being operated by suitable shipping devices in the usual manner. The end of the lever $f$ remote from its fulcrum $f^2$ is pivotally connected with one end of a link $i$, the other end of which is pivotally connected with a collar $k$, arranged to slide longitudinally on the hub portion $c^2$ and being operated by a shipping device in any usual manner.

The clutch member $c$ is preferably provided with a number of pairs of gripping-jaws $d$ $d^2$, the guideways of several of which are shown in Fig. 1 to co-operate with the flange $a$, each set of jaws and their actuating mechanism being capable of working independently of the others, except that all are connected with the same shipping-collar $k$, so that they are worked simultaneously by the movement of the said collar. A removal of one set of jaws or its disconnection from the said collar would not, however, effect the operation of the remaining sets.

The breaking of the toggle-joint $f^2$ $g$ $h^2$, as before stated, causes a separation of the jaws $d$ $d^2$, but does not necessarily determine the position of each jaw relative to the disk $a$, and if the lever $f$ were freely connected with the collar $k$, so that the said lever could move bodily in a radial direction with relation to the pulley when the jaws are separated, one of the jaws might be left bearing upon the corresponding side of the flange $a$ and might press against the same under the action of gravity or centrifugal force, so as to produce objectionable friction.

In order to insure that both jaws shall be removed from contact with the flange $a$ when the clutch is open, the collar $k$ is provided with stops $m$, which engage one with each of the links $i$, and thus prevent radial outward movement of the lever $f$ and connected jaw $d$ under the action of gravity or centrifugal force when the clutch is opened. The effect of the stop $m$ is clearly shown in Fig. 2, where it is apparent that the point $f^2$ and jaw $d$ cannot be moved in the upward direction in the said figure while the collar $k$ remains in its outward position, and thus the said stop $m$ by its engagement with the link $i$ insures the withdrawal of the jaw $d$ from the inner face of the flange $a$. Unless some means were provided to prevent it, however, the entire mechanism comprising the jaws $d$ $d^2$, the lever $f$, and link $h$ might move bodily downward under the action of gravity when in the position shown in Fig. 2, as the link $i$ must be free to turn downward on its pivotal connection with the collar $k$, in order to cause it to operate properly in closing the jaws. Such dropping of the jaws, which would cause the jaw $d^2$ to bear on the outer face of the flange $a$, is prevented by a spring $n$, which need be only stiff enough to sustain the weight of the jaws and their actuating-lever, holding the said parts sustained in the position with the link $i$ bearing against the stop $m$, as shown in Fig. 2, and thus insuring the separation of the jaw $d^2$ from the flange $a$. The adjustment of the stop $m$ will thus determine the position of both jaws when separated with relation to the flange $a$, as it will be recognized by Fig. 2 that turning the stop inward will bring the jaw $d^2$ nearer the flange if no other adjustment is made. The adjustment of the pivot-block $g$ will govern the amount of separation of the jaws $d$ $d^2$, the drawing of said block into the said lever bringing the points $f^2$ $h^2$ nearer together, and thus causing a wider separation of the jaws, while the reverse adjustment causes less separation of the jaws with the same position of the collar $k$.

The operation of closing and opening the jaws by the longitudinal movement of the collar $k$ will be readily understood from the foregoing description and from Figs. 2 and 3 of the drawings.

The operation in closing the jaws or in moving the parts from position shown in Fig. 2 to that shown in Fig. 3 may, however, be described as follows: The jaw $d$ tends to move outward (upward in Fig. 2) under the action of the spring $n$ and of centrifugal force if the pulley is running, thus keeping the link $i$ against the stop $m$ until the said jaw $d$ comes to a bearing upon the inner face of the flange $a$, after which the lever $f$ turns about the point $f^2$ as a fixed fulcrum, carrying the point $g$ toward the line between the points $f^2$ and $h^2$, and thus forcing the point $h^2$ downward and forcing the jaw $d^2$ against the outer face of the flange $a$, so that the said jaws $d$ $d^2$ grasp the flange between them like the jaws of a vise. The shank $e$ of the jaw $d$ is made channel-shaped, as shown in Fig. 4. so as to permit the lower end of the shank $e^2$ where connected with the link $h$ to work freely within it, and the shank $e^2$ of the jaw $d^2$ is made as an open frame or consists of two side bars, as clearly shown in Fig. 4, the joint between the lever $f$ and the jaw $d$ thus working freely through the opening in the shank of the jaw $d^2$. This construction, as before stated, admits of the jaws being removed from the clutch without otherwise disconnecting the clutch members from their shafts and bearings, and it also enables a pair of clutch-jaws, together with their actuating mechanism, to be removed from the clutch without taking apart or disconnecting the actuating mechanism and jaws. It is necessary only to disconnect the link $i$ from the lever $f$ or collar $k$ and to remove the cap-plate $c^5$ in order to remove the jaws and their actuating mechanism bodily from the clutch.

The term "pulley," as herein used referring to the part $c$, may include any device to which power is applied or from which power is received, it being essential only for the present invention that the said part should have the guideways for supporting the jaws, so that the latter co-operate with the flange $a$ of the other member of the clutch.

The relation of the two members of the clutch to the driving and driven parts is merely assumed for convenience, as it is obvious that the power might be applied to either one of the clutch members and transmitted to the other member when the jaws were closed or gripped, and removed from the other when said jaws were opened.

I claim—

1. In a clutch, the combination of the clutch member having a guideway with a pair of gripping-jaws having shanks working in said guideway and actuating mechanism for said jaws, said actuating mechanism, together with shanks of both jaws, being located all at one side of said guideway, whereby they may be removed from said clutch member without separation of other parts of the clutch, substantially as described.

2. The combination of the flanged member of a clutch with a co-operating clutch member and jaws movable therein toward and from the opposite faces of the said flange, a lever connected at one end with one of said jaws and provided with an adjustable pivot-piece, and a link connected with the said pivot-piece and with the other of said jaws, substantially as and for the purpose described.

3. The combination, with the flanged member of a clutch, of a co-operating clutch member and jaws movable therein toward and from the opposite faces of the said flange, a lever connected at one end with one of said jaws and at its other end with a link, a shipper-collar connected with the said link and provided with a stop limiting the movement thereof, and a link connecting the said lever with the other one of the clutch-jaws, substantially as described.

4. The combination of a pair of gripping-jaws, one having its shank provided with an opening, with a lever pivotally connected with the other jaw through said opening and a link pivotally connected with said lever and with the shank of the first-mentioned jaw, substantially as and for the purpose described.

5. The combination, with the flanged member of a clutch, of a co-operating clutch member and jaws movable therein toward and from the opposite faces of the said flange, a link connected with one of said jaws and a lever connected with the said link and with the other of said jaws, a shipper-collar and link connecting the same with the said lever, a stop limiting the movement of the last-mentioned link in one direction, and a spring tending to hold the said parts with the said link against its stop, substantially as and for the purpose described.

In testimony whereof I have signed my name to this specification in the presence of two subscribing witnesses.

LOUIS J. HIRT.

Witnesses:
 JOS. P. LIVERMORE,
 H. J. LIVERMORE.